Dec. 18, 1928.

A. F. A. AUCHTER 1,696,073

SAFETY DEVICE FOR VEHICLES

Filed Feb. 8, 1928  3 Sheets-Sheet 1

A. F. A. Auchter
INVENTOR

BY Victor J. Evans
ATTORNEY

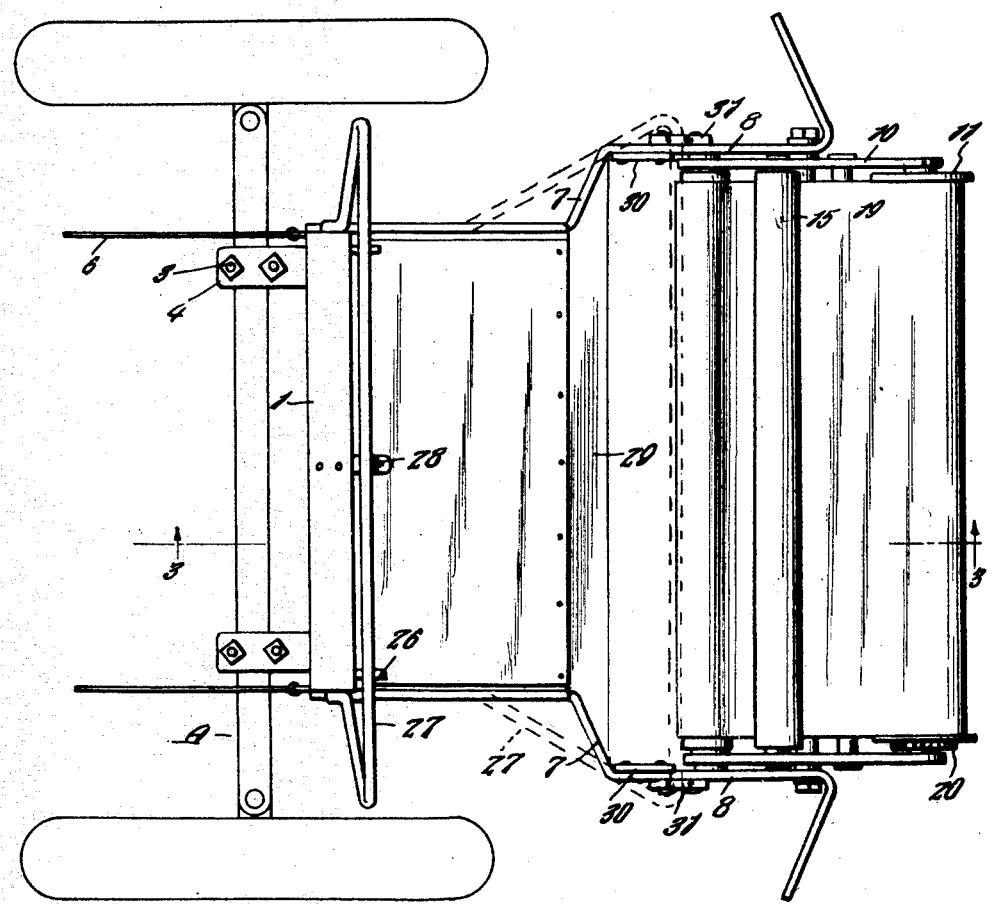
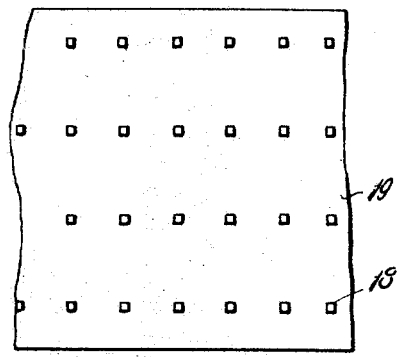

Dec. 18, 1928.　　　　　　　　　　　　　　　　　　1,696,073
A. F. A. AUCHTER
SAFETY DEVICE FOR VEHICLES
Filed Feb. 8, 1928　　　　3 Sheets-Sheet 3
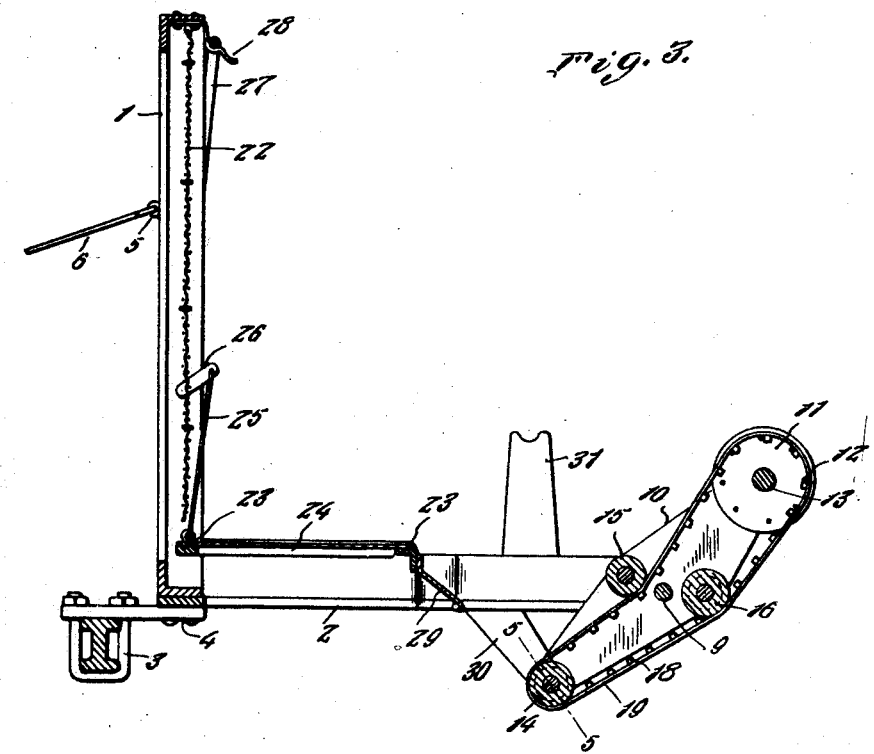
A.F.A.Auchter
INVENTOR
BY Victor J. Evans
ATTORNEY Patented Dec. 18, 1928.

1,696,073

UNITED STATES PATENT OFFICE.

ANTON FRED AUGUST AUCHTER, OF PITTSBURGH, PENNSYLVANIA.

SAFETY DEVICE FOR VEHICLES.

Application filed February 8, 1928. Serial No. 252,854.

This invention relates to vehicle fenders designed for the protection of pedestrians struck in the path of a vehicle.

The general object of the invention is to provide a safety device adapted to be secured to the front of a vehicle and which will pick up persons without injury and with minimum shock.

A further object of the invention is to provide a safety device for vehicles that will not interfere with the movement of the vehicle, is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 2 is a top plan view.

Figure 3 is a sectional view taken approximately on line 3—3 of Figure 2, looking in the direction of the arrows.

Figure 5 is a sectional view taken approximately on line 5—5 of Figure 3.

Figure 6 is a fragmentary plan view of the belt which forms a part of the present invention.

Figure 1:
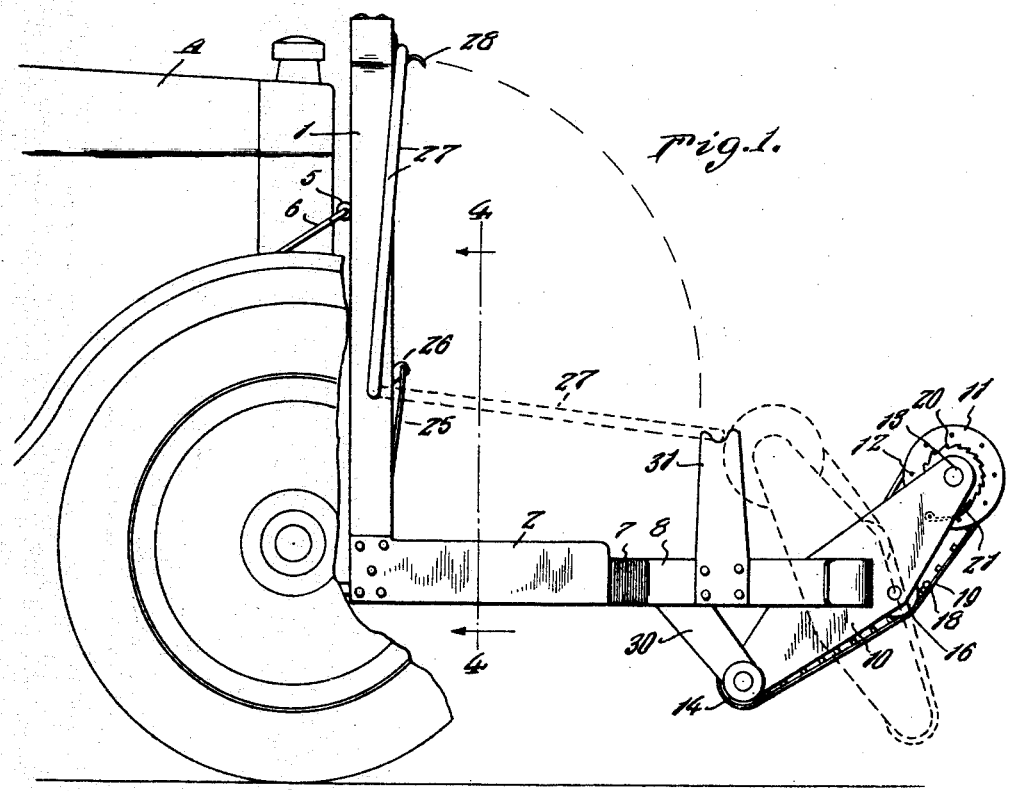
Figure 1 is a side elevation of the device forming the subject matter of the present invention and showing the same applied to the front end of a motor vehicle.
Figure 4:
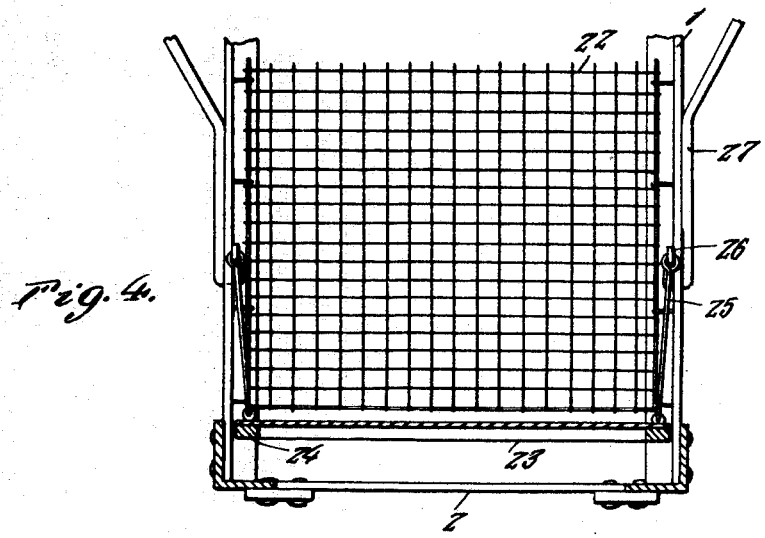
Figure 4 is a sectional view taken approximately on line 4—4 of Figure 1, looking in the direction of the arrows.

Referring to the drawings in detail, the letter A indicates the front axle of a motor vehicle, which has secured thereto the safety device in a manner to be arranged in advance of the vehicle, and while I have shown my device secured to a motor vehicle, I want it understood that it can be associated with other vehicles without departing from the spirit of the invention.

The device includes an upright frame 1 formed from angle iron and a horizontal frame 2 which is secured to the upright frame 1 through the medium of rivets or other well known securing means. The frames are fixed to the axle A through the medium of shackle bolts 3 passing through and secured to rearwardly extending strips 4 fixed to the bottom of the rearward end of the horizontal frame 2 as best shown in Figure 3 of the drawings. The upright frame 1 has formed therewith eyes 5 disposed upon opposite sides thereof for the purpose of receiving one of the ends of rods 6 while the opposite ends are suitably secured to the vehicle as will be readily apparent upon inspection of Figure 1 of the drawings.

The horizontal frame includes a pair of spaced arms which extend from the upright frame in parallelism and thence are curved outwardly upon themselves as at 7 to terminate in parallel portions 8 which have their outer ends bent rearwardly at an inclination as best shown in Figure 2 of the drawings. Pivotally secured between the parallel portions 8 and adjacent the juncture of the rearwardly inclined portions through the medium of a pivot rod 9 is a pair of plates 10 enlarged at their central portions and being tapered toward their ends as best shown in Figure 1. Journaled at one of the ends of the plates 10 is a drum 11 which includes rods 12 having their ends secured in the disks forming the ends of the drum, and these disks are secured to a shaft 13. Arranged at the opposite ends of the plates 10 and mounted for rotation therein is a roller 14, and rollers 15 and 16 are journaled in the plates adjacent the side edges and centrally thereof. The rollers 14 and 16 are each provided with a plurality of circumferentially arranged grooves 17 disposed therein at equal intervals for the purpose of receiving studs 18 extending inwardly from a belt 19 which is trained about the drum and the roller 14 as best shown in Figure 5. The roller 15 acts to retain the belt in tight engagement with the remaining rollers and drum and also to incline the belt at its upper run as shown. The studs 18 will engage the rods 12 which of course will result in the rotation of the belt when the drum is rotated. Secured to the shaft 13 is a ratchet 20 which is provided with a spring pawl 21 secured to one of the disks of the drum while its opposite end is arranged in contacting engagement with the teeth of the ratchet for the purpose of confining rotation of the drum to one direction.

Arranged in the upright frame 1 and secured therein is a shield 22 formed from wire mesh of relatively large interstices and so that it will give under weight to prevent injury to persons, animals or objects coming in contact therewith.

A seat formed from canvas or other flexible material and including a pair of longitudinal strips 23 and cross strips 24 is arranged between the arms of the horizontal frame, and one of the longitudinal strips is loosely secured to the arms, while the other longitudinal strip is free and has secured thereto one of the ends of rods 25, while the opposite ends of said rods 25 are received by links 26 fixed to the ends of a substantially U-shaped member 27. The U-shaped member has its ends pivotally mounted in the sides of the upright frame 1, and is held in normal position through the instrumentality of a spring finger 28 secured to and extending forwardly at a downward inclination from the upper portion of the upright frame, as best shown in Figures 1 and 3 of the drawings. Disposed between the curved outwardly extending portions 7 of the horizontal frame 2 is a plate 29 for the purpose of cooperating with the seat for closing the rearward portions of the horizontal frame. Extending from the bottom of the arms of the horizontal frame and disposed at a forward inclination therefrom is a pair of arms 30 having bifurcated outer ends for the purpose of receiving the shaft of the roller 14 for retaining the belt carrying members in normal position as shown in full lines in Figure 1. The weight of the drum retains the same in this position. Rising from the arms of the horizontal frame and disposed in parallelism with respect to each other are uprights 31 having bifurcated upper ends for the purpose of receiving the U-shaped member 27 and supporting the same in the position as shown in dotted lines in Figure 1. The U-shaped member acts as a guide as will be readily apparent.

From the above description and disclosure of the drawings, it will be obvious that I have provided a safety device primarily designed for motor vehicles, and adapted to be secured to the forward end thereof for the purpose of protecting pedestrians, and in the event a person should be struck by the forward end of the device the weight of the person would cause the belt carrying members to assume the position as shown in dotted lines in Figure 1, and direct the person to the seat as the speed of the vehicle and the weight of the person together with the falling action of said person will cause the roller 11 to rotate for moving the belt in a direction toward the seat for carrying the person accordingly. The weight of the person upon the seat will pull upon the rods 25 and cause the U-shaped member to drop to the position as shown in dotted lines so as to prevent a person from falling from the seat.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A safety device for motor vehicles comprising an upright frame, a horizontal frame secured to the upright frame, means for securing the frames to a motor vehicle, a pair of plates pivotally secured between the forward ends of the horizontal frame, a drum carried by one end of said plates, a belt trained about said drum, rollers receiving said belt, a seat loosely mounted and carried by the horizontal frame, and a guard member carried by the upright frame and being moved to an operative position when weight is applied to said seat.

2. A safety device for motor vehicles comprising an upright frame, a horizontal frame secured to the upright frame, means for detachably securing the frames to a motor vehicle, spaced arms included in the horizontal frame and being provided with parallel portions terminating in rearwardly inclined ends, a pair of plates pivotally secured between their ends and the ends of the parallel portions at the juncture of the rearwardly inclined portions therewith, a drum including disks, rods secured to and extending between said disks, rollers journaled between said plates, a belt trained about the rollers and drum, a seat loosely mounted in the horizontal frame, a shield disposed in the upright frame, and a guard member carried by the upright frame and movable to operative position by said seat.

3. A safety device for motor vehicles comprising an upright frame, a horizontal frame secured to the upright frame, means for securing the frames to the forward end of a motor vehicle, a seat loosely mounted in the horizontal frame, a guard member carried by the upright frame, a shield capable of giving under weight and secured to the upright frame, means pivotally secured between the forward ends of the horizontal frame for directing a person struck thereby toward the seat, and means between said seat and guard member for operating the latter.

4. A safety device for motor vehicles comprising a pair of frames disposed at right angles with respect to each other, a seat loosely mounted and carried by one of said frames, a guard member carried by the other of said members, means for retaining the guard member in normal position, means for directing an object struck by the device to the seat and means between the seat and guard member for moving the latter to its operative position about the seat.

5. A safety device of the character described comprising an upright frame, a horizontal frame secured to the upright frame, means for securing the frames to a motor vehicle, a shield formed from wire mesh and secured to the upright frame, a guard member pivotally secured to the upright frame, a resilient finger on the upright frame for retaining the guard member in normal position, a seat loosely mounted and carried by the horizontal frame, rods connected with said seat, links connected with said rods and being secured to the guard member, means pivotally secured between the forward ends of the horizontal frame for directing a person toward and on the seat, and means rising from the horizontal frame for supporting the guard member in operative position.

6. A safety device for motor vehicles comprising an upright frame, a horizontal frame, means for securing the frames to a motor vehicle, a seat having one end loosely mounted upon the horizontal frame, a guard member pivotally secured to the horizontal frame, means between said seat and guard member for operating the latter from a normal to an operative position, and means pivotally secured between the forward ends of the horizontal frame for directing a person toward and on the seat.

7. A saftey device of the character described comprising an upright frame formed from angle iron, a horizontal frame secured to the bottom of the upright frame, means for securing the frames to the forward end of a motor vehicle, a shield carried by the upright frame, a seat having one end loosely mounted on the horizontal frame, a guard member pivotally secured to the upright frame, means between the seat and guard member for operating the latter to operative position about said seat, means for supporting the guard member in its operative position, a pair of plates pivotally secured between the forward ends of the horizontal frame, a drum including disks and being journaled between one of the ends of said plates, rods included in said drum, a belt trained about said drum, studs extending inwardly from said belt, and rollers journaled between said plates and being provided with grooves for receiving said studs, a belt tightener roller between said plates, and said studs being engageable with said rods.

In testimony whereof I affix my signature.

ANTON FRED AUGUST AUCHTER.